United States Patent [19]

Ermini

[11] 4,239,737

[45] Dec. 16, 1980

[54] METHOD FOR REMOVING SULFUR DIOXIDE

[75] Inventor: Erminio Ermini, Genoa-Quarto, Italy

[73] Assignee: Italsider S.p.A., Genoa, Italy

[21] Appl. No.: 968,004

[22] Filed: Dec. 11, 1978

Related U.S. Application Data

[63] Continuation-in-part of Ser. No. 867,449, Jan. 6, 1978, abandoned.

[30] Foreign Application Priority Data

Jan. 14, 1977 [IT] Italy ................. 12421 A/77

[51] Int. Cl.$^3$ ............................. C01B 17/00
[52] U.S. Cl. ................................ 423/242; 423/52; 423/166
[58] Field of Search ............... 423/242 A, 244 A, 166, 423/52, 242 R

[56] References Cited

U.S. PATENT DOCUMENTS

| | | | |
|---|---|---|---|
| 3,150,923 | 9/1964 | Bienstock et al. | 423/244 A |
| 3,492,083 | 1/1970 | Lowicki et al. | 423/244 A |
| 3,836,630 | 9/1974 | Noguchi et al. | 423/242 |
| 3,914,387 | 10/1975 | von Jardan et al. | 423/166 |

*Primary Examiner*—Earl C. Thomas
*Assistant Examiner*—Gregory A. Heller
*Attorney, Agent, or Firm*—Robert E. Burns; Emmanuel J. Lobato; Bruce L. Adams

[57] ABSTRACT

Sulfur dioxide is removed from waste gases generated in a thermoelectric plant by contacting the gases countercurrently with an aqueous alkaline solution having a pH of about 9–12 and containing both sodium hydroxide and manganic hydroxide, whereby the sulfur dioxide reacts with the sodium hydroxide to form sodium sulfite until the pH of the solution is about 6–7 and the sodium hydroxide is substantially exhausted and wherein the sulfur dioxide then reacts with the manganic hydroxide to form manganese sulfite. The resultant sodium sulfite and manganese sulfite are oxidized and transformed into sodium sulfate and manganese sulfate respectively, by the action of oxygen in the mixture, in the presence of the manganic ion and also by the direct oxidizing action of the manganic ion.

7 Claims, 1 Drawing Figure

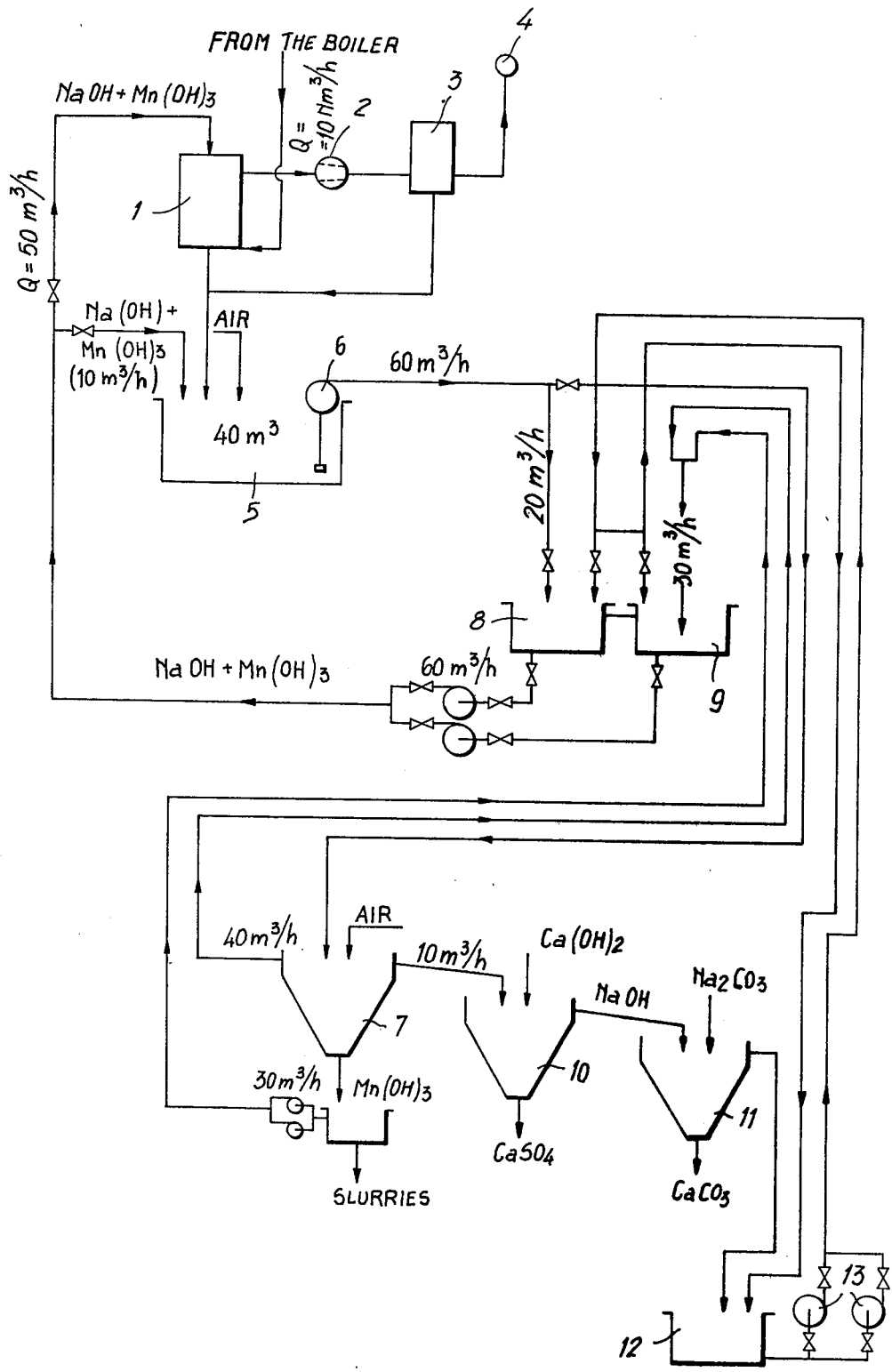

METHOD FOR REMOVING SULFUR DIOXIDE

This application is a continuation-in-part of my application Ser. No. 867,449 filed on Jan. 6, 1978 and now abandoned.

BACKGROUND OF THE INVENTION

The present invention is concerned with the reduction of pollution in areas where thermoelectric power plants are present and also with an improvement in the environment of such plants. More particularly, the invention relates to the problem of removing sulfur dioxide from the smoke which develops as a result of the combustion of heavy mineral oils; sulfur dioxide forms as a result of the reaction between oxygen and the sulfur present in such oils.

The problems arising from the undesirable production of sulfur dioxide in thermoelectric power plants are of great concern; however, to the present time, these problems have not been solved in a satisfactory manner.

While methods involving the dispersion of smoke containing sulfur dioxide are known, such methods are carried out substantially by conveying the smoke to a sufficiently tall chimney where it is diluted and no longer dangerous. This solution may prevent the pollution of the area immediately surrounding the power plant, however it has inconveniences and in any event is not completely satisfactory. As a matter of fact, owing to the winds, the problem may simply be transferred from one area to another.

Methods based on the adsorption of sulfur dioxide on suitable supports and in the presence of catalytic agents of particular chemical nature also have been suggested. However, such methods have, in practice, both technical and economic inconveniences. Sulfur dioxide is highly diluted in the combustion gases and accordingly, a reliable removable process should include large contact surfaces and reaction beds of substantial height.

It is further known from U.S. Pat. Nos. 3,920,794 and 3,914,387 that sulfur dioxide may be absorbed in an alkaline solution, wherein the sulfur dioxide is converted into a sulfite, for example, sodium sulfite which is then oxidized to a sulfate, for example sodium sulfate, due to the action of oxygen and air in the presence of a catalyst which has been added to the absorption solution. The quantity of oxidation catalyst in the absorption liquid is in the range of some parts per million, a quantity which may be effective for catalytic activity, but which does not permit the catalyst to participate directly in the absorption reaction.

In these processes the absorption reaction, i.e. the reaction between sulfur dioxide and the alkaline reagent takes place countercurrently in washing towers, wherein the gas in fed from below, while the alkaline solution is fed from above. After contact with sulfur dioxide, the alkaline absorbent solution becomes neutral or acid; therefor it is evident that the adsorption reaction occurs mainly in the upper zone of the washing tower, because in the lower zone, the sulfur dioxide meets a neutral or slightly acid solution in which the absorption reaction does not occur. Thus, the total height of the washing tower is not actually used to absorb sulfur dioxide and accordingly, the process is inefficient.

SUMMARY OF THE INVENTION

It is an object of the present invention to provide an improved method for removing sulfur dioxide from gaseous mixtures thereof, particularly from mixtures of gas resulting from the combustion of heavy mineral oils.

A further object of the present invention is the removal of sulfur dioxide in a particularly efficient manner from gas generated in a thermoelectric plant.

A further particular object of this invention is the provision of a method for removing sulfur dioxide from a gaseous mixture using a countercurrently flowing absorbent solution, wherein sulfur dioxide is absorbed throughout the countercurrently flowing solution and a still further object of of the present invention is the provision of a method for removing sulfur dioxide from a gaseous mixture by means of a countercurrently flowing absorbent solution containing two different reagents which react with sulfur dioxide at different pH values.

Other objects and advantages of the instant invention will become apparent from the following description thereof.

The method of the invention is based on the principle of causing sulfur dioxide to undergo two different absorption reactions in the absorbent solution; the first reaction takes place in an alkaline solution having a pH of about 9–12 and the second reaction takes place in the zone of the absorbent solution which has become neutral or slightly acid, having a pH of about 6–7.

According to the invention sulfur dioxide contained in a mixture of combustion gases is removed therefrom by:

contacting the mixture of gases containing sulfur dioxide with a countercurrent flow of an alkaline absorption solution having a pH of about 9–12 and containing both sodium hydroxide and manganic hydroxide in amounts effective to react with the sulfur dioxide, the gaseous mixture and/or the absorption solution also containing oxygen, whereby the sulfur dioxide is absorbed in the absorption solution and undergoes reaction in two different stages:

(a) a first absorption stage wherein sulfur dioxide is absorbed in the alkaline solution and reacts with the sodium hydroxide to form sodium sulfite until the pH of the absorption solution is reduced to about 6–7 and (b) a second absorption stage wherein the sulfur dioxide is absorbed in the absorption solution at a pH of about 6–7 and the sulfur dioxide reacts with manganic hydroxide to form manganic sulfite and wherein in both stages the manganese and sodium sulfites are transformed into the corresponding manganese and sodium sulfates by the action of oxygen in the presence of the manganic ion and also by the direct oxidizing action of the manganic ion, regenerating the manganic hydroxide by adding sodium hydroxide to the spent absorption solution until the pH of the spent solution is about 9–10 and blowing air into the spent absorption solution in order to transform the manganese sulfate into manganic hydroxide and regenerating the sodium hydroxide by adding calcium hydrate to the spent absorption solution in an excess of the amount necessary to transform the sodium sulfate therein to sodium hydroxide and calcium sulfate.

BRIEF DESCRIPTION OF THE DRAWING

In the drawing, the FIGURE is a block diagram of a preferred embodiment of a device suitable to embody the method of the invention.

DESCRIPTION OF THE INVENTION

When the method of the present invention is carried out using a washing tower, wherein gas containing sulfur dioxide is fed from below and the washing or absorption solution is fed countercurrently from above, sulfur dioxide is absorbed not only in the upper part of the washing tower in a zone of alkaline absorption solution, but also in the lower part of the washing tower, in a neutral or slightly acid zone, wherein the sodium hydroxide in the absorption liquid has been substantially spent due to the absorption reactions which have occurred in the upper, alkaline zone of the washing tower.

To accomplish the foregoing, the alkaline washing solution contains both sodium hydroxide and manganic hydroxide in amounts such that initially, sulfur dioxide is absorbed and reacts with sodium hydroxide; when the sodium hydroxide is substantially spent, and the absorption solution has become neutral or slightly acidic, the sulfur dioxide is absorbed and reacts with manganic hydroxide. Thus, manganic hydroxide is present in the alkaline absorption solution in an amount such that the $Mn^{+++}$ ion is an effective oxidation catalyst throughout the countercurrently flowing absorption solution, i.e. in both the upper and lower part of the washing tower, which requires a concentration of $Mn^{+++}$ ion of only a few parts per million and in the lower part of the washing tower, where the flowing absorbent solution has become neutral or slightly acid, manganic hydroxide is an effective second absorption reactant for sulfur dioxide. Accordingly, the quantity of manganic oxide in the absorbent solution is effective to react with sulfur dioxide when the sodium hydroxide has become substantially exhausted and thus, the absorbent solution is substantially neutral or slightly acidic. About 0.08 g/l of manganic hydroxide is present in the alkaline-absorbing solution, more preferably about 0.06 to 0.12 g/l.

The amount of sodium hydroxide is such that the absorption solution has a pH of about 9–12. The best condition is pH 11, i.e. 0.04 g/l of NaOH.

The process of the present invention, and particularly the various reactions which take place during the present process will be described in greater detail.

The gaseous mixture containing sulfur dioxide is washed with an alkaline solution containing both sodium hydroxide, NaOH and manganic oxide $Mn(OH)_3$. In the first absorption stage, sulfur dioxide combines with sodium hydroxide according to the following equation:

$$2NaOH + SO_2 \rightarrow Na_2SO_3 + H_2O$$

In this stage, the manganic hydroxide acts as an oxidizing catalyst, whereby, in the presence of air or oxygen, the sodium sulfite is converted into sodium sulfate according to the equation:

$$2Na_2SO_3 + O_2 \rightarrow 2Na_2SO_4$$

In addition, the manganic oxide is also effective as a direct oxidizing agent to convert sodium sulfite into sodium sulfate according to the reaction:

$$Na_2SO_3 + 2Mn(OH)_3 \rightarrow Na_2SO_4 + 2Mn(OH)_2 + H_2O$$

As a result of the absorption of sulfur dioxide by sodium hydroxide, the proportion of sodium hydroxide in the solution as well as the pH thereof are reduced progressively, until the solution has a pH of about 6.

The foregoing may be summarized by the single reaction:

$$2Mn(OH)_3 + 2H_2SO_3 \rightarrow MnSO_4 + MnSO_3 + 5H_2O$$

It is also probable that during the step of oxidation of manganous hydrate, manganese dioxide, $MnO_2$, is formed which cooperates in the direct absorption of sulfur dioxide according to the reaction:

$$MnO_2 + H_2SO_3 \rightarrow MnSO_4 + H_2O$$

During this step, the solubility of manganese hydrate increases progressively; the manganese hydrate is dissolved by the sulfurous acid and thus, cooperates in a direct way in the absorption of sulfur dioxide.

In the neutral-acid zone of the absorbent solution, the following reactions occur:

$$2Mn(OH)_3 + SO_2 \rightarrow MnSO_4 + Mn(OH)_2 + 2H_2O$$

$$Mn(OH)_2 + SO_2 \rightarrow MnSO_3 + H_2O$$

$$MnSO_3 + 2Mn(OH)_3 \rightarrow MnSO_4 + 2Mn(OH)_2 + H_2O$$

$$MnSO_3 + \tfrac{1}{2}O_2 \rightarrow MnSO_4$$

After treatment with the absorbent liquid, the remaining part of the gaseous mixture is conveyed to the chimney.

The solution resulting from the absorption of sulfur dioxide and the subsequent oxidation of the sulfite ions to sulfate, is treated in further steps of the present process to regenerate manganic hydroxide and also sodium hydroxide. To this end, compressed air is blown into the absorption solution and then fresh sodium hydroxide is added thereto so as to oxygenate the absorption solution and effect the regeneration of $Mn(OH)_3$, according to the following reactions:

$$2MnSO_4 + 4NaOH \rightarrow 2Mn(OH)_2 + 2Na_2SO_4$$

$$2Mn(OH)_2 + \tfrac{1}{2}O_2 + H_2O \rightarrow 2Mn(OH)_3$$

During this step of the process, trivalent manganese ions in the form of $Mn(OH)_3$ or bivalent manganese ions in a form such as $MnSO_4$ may be added to the solution. Also, according to the invention, the trivalent manganese hydroxide, formed in the step of oxidation of the manganous hydroxide is recycled in order to be used in the steps of absorption of the sulfur dioxide.

In order to remove the sodium sulfate formed as described above, it is transformed into a neutral or insoluble product; in a further step of the present process, the absorption solution is treated with an excess of calcium hydrate which reacts with the sodium sulfate causing the precipitation of calcium sulfate according to the reaction $$Na_2SO_4 + Ca(OH)_2 \rightarrow 2NaOH + CaSO_4$$

The excess calcium hydrate is then removed by reaction with sodium carbonate which precipitates the excess calcium ions in the form of calcium carbonate as shown below:

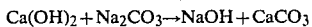

Finally, according to the invention, the sodium hydroxide obtained by the reaction of calcium hydroxide is recycled and used for the absorption of sulfur dioxide and the oxidation of manganous hydroxide.

DESCRIPTION OF A PREFERRED EMBODIMENT

With reference to the figure, combustion gases coming from the boiler are conveyed to a washing tower 1 where 50 m.$^3$/h. of an absorption solution containing 0.10 g/l of Mn(OH)$_3$ and 0.04 g/l of NaOH is fed countercurrently from the top. The SO$_2$ content of the combustion gases is about 1000 mg/Nm$^3$. Sulfur dioxide in the combustion gases is absorbed by the solution. The remaining gases are sucked by an electroblower 2 and through a drop separator 3 are conveyed to a stack 4. The remaining gases contains only the 5% of the starting SO$_2$ content.

The solution resulting after the treatment is collected in a treatment zone, tank 5 which contain about 40 m$^3$ of the spent absorption solution, and which receives about 10 m.$^3$/h. of aqueous solution containing sodium hydrate in an amount of about 0.04 g/l and manganic hydroxide in an amount of about 0.10 g/l. to provide the desired concentration of reagents in the solution in tank 5. Compressed air is also blown into the solution in tank 5. By means of a lifting pump 6, having a delivery of about 60 m.$^3$/h., part of the liquid, i.e. about 40 m.$^3$/h. is moved from the tank 5 to the tank 7, which is the first unit of the final treatment device, while the remaining part of the liquid is conveyed through the tank 8, to a partial direct recycling system. Compressed air is also blown into the tank 7. Mn(OH)$_3$ is separated from the solution present in tank 7, discharged into the tank 9 and then recycled into the absorption liquid. From tank 7, 30 m.$^3$/h. of liquid are discharged and conveyed to the feeding tank 9 and recycled into the absorption liquid.

About 10 m.$^3$/h. of the mixture in tank 7 are transferred to the tank 10, to which is also added calcium hydrate, whereby the sodium sulfate present in the liquid mixture is transformed into sodium hydroxide with the concomitant precipitation of calcium sulfate which is removed therefrom. The resultant solution in tank 10 is then sent to a softening zone in tank 11; sodium carbonate is also introduced into tank 11 in order to react with the excess calcium ions to produce calcium carbonate which precipitates and is then removed. From tank 11, regenerated solution, free of calcium ions is conveyed into tank 12, from where it is fed, by means of pump 13 to tanks 8 and 9 for recycling.

Finally, the figure can be further clarified by the following: in duct 100 is contained the exhaust absorption solution made of Na$_2$SO$_4$, MnSO$_4$, sulphites, plus the fraction of solution which has not reacted.

In duct 101 takes place the transport of manganese hydroxide Mn(OH)$_3$ regenerated in tank 5, on the bottom of which it collects in the form of flocculated material; besides manganese hydroxide, also Na$_2$SO$_4$ is transported in duct 101. In duct 102 is transported the concentrated Na$_2$SO$_4$ solution, which has been previously separated from flocculated Mn(OH)$_3$ on the bottom of tank 7. Duct 103 serves for the recovery of manganese hydrowide Mn(OH)$_3$. Duct 104 serves for the partial recycling of sodium hydroxide NaOH Duct 105 serves for balancing the amounts of sodium hydroxide. Duct 106 transfers the sodium sulphate solution Na$_2$SO$_4$ from tank 7 to the successive tank 10. Dict 107 serves for transferring residuals from tank 10 to tank 1. Finally, in duct 108 takes place the last recovery of NaOH, which is fed into tank 8 to reinstate the parent solution, which is then sent through duct 109 to the head of the washing column and to the regeneration tank 5. Therefore, in duct 109 circulates the regenerated solution, containing 0.04 g/l of NaOH and 0.10 g/l of Mn(OH)$_3$.

What I claim to secure by Letters Patent is:

1. A method for removing sulfur dioxide contained in a mixture of combustion gases comprising:
   contacting the mixture of gases containing sulfur dioxide with a countercurrent flow of an alkaline absorption solution having a pH of about 9–12 and containing both sodium hydroxide and manganic hydroxide in amounts effective to react with the sulfur dioxide, either the gaseous mixture or the absorbing solution or both also containing oxygen, whereby the sulfur dioxide is absorbed in the absorbing solution and undergoes reaction in two different stages:
   (a) a first absorption stage wherein sulfur dioxide is absorbed in the alkaline solution and reacts with the sodium hydroxide to form sodium sulfite, which takes place until the pH of the solution is reduced to about 6–7 and
   (b) a second absorption stage wherein the sulfur dioxide is absorbed in the absorption solution at a pH of about 6–7 and the sulfur dioxide reacts with manganic hydroxide, to form manganic sulfite and wherein in both stages the manganese and sodium sulfites are transformed into the corresponding manganese and sodium sulfates by the action of said oxygen on the presence of the manganic ion and also by the direct oxidizing action of the manganic ion,
   regenerating the manganic hydroxide by adding sodium hydroxide to the spent absorption solution until the pH of the spent solution is about 9–12 and blowing air into the spent absorption solution in order to transform the manganese sulfate into manganic hydroxide and
   regenerating sodium hydroxide by adding calcium hydrate to the spent absorption solution in excess of the amount necessary to transform the sodium sulfate therein to sodium hydroxide and calcium sulfate.

2. A method according to claim 1, wherein the trivalent manganese hydroxide formed in the step of regeneration of the manganous hydroxide is recycled so as to be used in the alkaline absorption solution which contacts the sulfur dioxide containing gas.

3. A method according to claim 1, wherein the excess calcium hydrate used to regenerate the sodium hydroxide is removed by adding sodium carbonate to the solution thereof, whereby calcium carbonate precipitates and is removed from the solution.

4. A method according to claim 1, wherein the regenerated sodium hydroxide is recycled to the alkaline absorption solution used to contact the gases containing sulfur dioxide and to the step of regenerating manganous hydroxide.

5. A method according to claim 1, wherein the alkaline absorption solution contains about 0.10 g/l of Mn(OH)$_3$ and about 0.04 g/l of NaOH.

6. A method according to claim 1 wherein the alkaline absorption solution contains about 0.06 to 0.12 g./l. of manganic hydroxide.

7. A method according to claim 1 wherein the trivalent manganese hydroxide formed in the step of regeneration of the manganous hydroxide is recycled so as to be used in the alkaline adsorption solution which contacts the sulfur dioxide containing gas, wherein the excess calcium hydrate used to regenerate the sodium hydroxide is removed by adding sodium carbonate to the solution thereof, whereby calcium carbonate precipitates and is removed from the solution, and wherein the regenerated sodium hydroxide is recycled to the alkaline absorption solution used to contact the gases containing sulfur dioxide and to the step of regenerating manganous hydroxide.

* * * * *